US011190983B2

(12) United States Patent
Gapin et al.

(10) Patent No.: US 11,190,983 B2
(45) Date of Patent: Nov. 30, 2021

(54) NETWORK LATENCY CONTROL (71) Applicant: T-Mobile USA, Inc., Bellevue, WA (US)

(72) Inventors: Andrew Gapin, Seattle, WA (US); Yun-Ling Jocelyn Wang, Bellevue, WA (US); Taha Najeeb, Bellevue, WA (US); Jeffery A. Smith, Bothell, WA (US); Paul Bongaarts, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 49 days.

(21) Appl. No.: 16/702,722

(22) Filed: Dec. 4, 2019

(65) Prior Publication Data

US 2020/0336945 A1    Oct. 22, 2020

Related U.S. Application Data (60) Provisional application No. 62/836,869, filed on Apr. 22, 2019.

(51) Int. Cl.
*H04W 28/22* (2009.01)
*H04L 12/927* (2013.01)

(52) U.S. Cl.
CPC .......... *H04W 28/22* (2013.01); *H04L 47/803* (2013.01)

(58) Field of Classification Search
None
See application file for complete search history.

(56) References Cited

U.S. PATENT DOCUMENTS

| 7,113,510 | B2* | 9/2006 | Lin ..................... H04L 47/24 370/394 |
| 7,551,560 | B1* | 6/2009 | Duong-van ......... H04L 43/0864 370/232 |
| 8,532,030 | B2* | 9/2013 | Koc ..................... H04L 5/001 370/328 |
| 9,154,421 | B2* | 10/2015 | Sonnier ............... H04L 43/0852 |
| 9,571,406 | B2* | 2/2017 | Bergamasco ........... H04L 47/30 |
| 10,142,248 | B2* | 11/2018 | Akhavain Mohammadi ............... H04L 45/38 |

(Continued)

FOREIGN PATENT DOCUMENTS

KR    20090018072 A    2/2009

OTHER PUBLICATIONS

The Extended European Search Report dated Jul. 1, 2020 for European Patent Application No. 20168492.5, 13 pages.

(Continued)

*Primary Examiner* — Tri H Phan
(74) *Attorney, Agent, or Firm* — Lee & Hayes, P.C.

(57) ABSTRACT

Techniques for network scheduling that may provide consistent latency in content delivery are described. For example, the techniques may include receiving, by a scheduler of a carrier network, a consistent latency request associated with an application operating on a user equipment (UE), the consistent latency request including a specified latency value. Based at least in part on the specified latency value, the scheduler of the carrier network may schedule transmission of one or more packets associated with the application operating on the UE to cause the one or more packets to arrive at the UE with an inter-packet delay substantially equal to the specified latency value.

20 Claims, 6 Drawing Sheets (56) References Cited

U.S. PATENT DOCUMENTS

| | | | |
|---|---|---|---|
| 10,484,291 B2* | 11/2019 | Robitaille | H04L 43/0894 |
| 2005/0058065 A1* | 3/2005 | Tiller | H04L 47/39 |
| | | | 370/229 |
| 2008/0239960 A1 | 10/2008 | Burckart et al. | |
| 2011/0268052 A1 | 11/2011 | Koc et al. | |

OTHER PUBLICATIONS

Samsung, "Updates for Deterministic Delay QoS", 3GPP Draft; S2-1813069 S2-1811768 23734 Updates for Deterministc Delay QoS (Solution #17), 3rd Generation Partnership Project, vol. SA WG2, no. West Palm Beach, US; 20181126-20181130 Nov. 29, 2018, Retrieved from the Internet: URL:http://www.3gpp.org/ftp/Meetings%5F3GPP%5FSYNC/SA2/Docs/S2%2DI813069%2Ezip; 9 pages.

* cited by examiner

502 REQUESTING, BY A USER EQUIPMENT (UE), A SCHEDULER OF A CARRIER NETWORK TO SCHEDULE TRANSMISSION OF ONE OR MORE PACKETS ASSOCIATED WITH AN APPLICATION OPERATING ON THE UE TO CAUSE THE ONE OR MORE PACKETS TO ARRIVE AT THE UE WITH AN INTER-PACKET DELAY LESS THAN A SPECIFIED LATENCY VALUE

504 RECEIVE THE ONE OR MORE PACKETS ASSOCIATED WITH THE APPLICATION OPERATING ON THE UE

506 BUFFERING, AT THE UE, THE ONE OR MORE PACKETS ASSOCIATED WITH THE APPLICATION OPERATING ON THE UE AS THE ONE OR MORE PACKETS ASSOCIATED WITH THE APPLICATION OPERATING ON THE UE ARE RECEIVED

508 BASED AT LEAST IN PART ON THE SPECIFIED LATENCY VALUE, PROVIDING A BUFFERED PACKET OF THE ONE OR MORE PACKETS ASSOCIATED WITH THE APPLICATION OPERATING ON THE UE TO THE APPLICATION OPERATING ON THE UE TO CAUSE AN INTER-PACKET DELAY SUBSTANTIALLY EQUAL TO THE SPECIFIED LATENCY VALUE

NETWORK LATENCY CONTROL

CROSS-REFERENCE TO RELATED APPLICATIONS

This application claims priority to U.S. Provisional Patent Application No. 62/836,869 entitled "Network Latency Control," filed Apr. 22, 2019, which is incorporated herein by reference in its entirety.

BACKGROUND

Long-Term Evolution (LTE) is a 4G wireless communications standard developed by the $3^{rd}$ Generation Partnership Project (3GPP) that is designed to provide increased speeds for mobile devices such as smartphones, tablets, netbooks, notebooks, wireless hotspots, etc. 4G LTE technologies are designed to provide IP-based voice, data, and multimedia streaming at high speeds.

The spectrum and backhaul resources of telecommunication networks are limited. As these networks communicate an increasing amount of data, congestion, delay, and failed connections become more common. Voice calls, video calls, and other real-time communications are often dropped, web pages load slowly, and movies must repeatedly pause in order for their buffers to refill. With such demands and limited resources, some priority must be given to certain types of network traffic. To provide such priority, telecommunication networks associate traffic with quality-of-service (QoS) classes. Such classes may refer to specific types of applications or service (e.g., voice calling, network browsing, etc.), different data types, different service categories, etc. Traffic of a higher priority QoS class may receive a better allocation of resources (e.g., frequency blocks, etc.) than traffic of a lower priority QoS class. Further, the QoS classes may be assigned different weights that affect the impact of the priorities. However, while such prioritization schemes may improve factors such as latency as an absolute metric, these schemes may fail to provide consistent content delivery.

BRIEF DESCRIPTION OF THE DRAWINGS

Objects, features, and advantages of various aspects will become more apparent when taken in conjunction with the following description and drawings. Identical reference numerals have been used, where possible, to designate identical features that are common to the figures. The attached drawings are for purposes of illustration and are not necessarily to scale.

DETAILED DESCRIPTION

The described implementations may relate to delivering user data over a cellular network using techniques and systems that may prioritize and ensure consistent latency for the user data rather than, for example, a best effort or lowest latency. Providing consistent latency in the delivery of data may be applicable in applications like gaming and delivery of video and media content. The human brain can compensate, to some extent, for latency but variations in latency may disrupt the brain's ability to compensate and adjust, thereby degrading the user's experience. Further, reducing latency variation may also reduce the occurrence of traffic spikes. As such, by providing consistent latency for media experiences, examples herein may improve user satisfaction.

The term "consistent," as used herein, does not require that successive packets' latencies be identical. In some examples, "consistent" latencies are within ±5%, ±10%, ±20%, ±25%, or ±50% of each other, or within another predetermined range.

In some examples, a base station (e.g. an Evolved Node B or eNodeB) may receive a desired latency from an application operating on a user equipment (UE) and the scheduler on the base station prioritize that specific desired latency when determining how to schedule the delivery of data packets to or from that application over the radio interface.

Some examples include application-level scheduling awareness to provide improved performance. For example, the application on the UE may communicate a desired constant latency (e.g. 50 ms) or a latency bound (e.g. 45-55 ms) (also referred to herein as a latency range or a latency with a threshold tolerance) that the scheduler may consider along with the other information such as network conditions to schedule the transmission of packets to cause the receipt of the packets at the desired constant latency. Some examples may also limit the effects of inconsistent latency by compensating on the UE with buffering or other techniques.

In an example, if an application desires 50 ms latency and the best possible latency for the current network conditions is 20 ms, then the scheduler on the base node may purposely slow down or delay delivery to cause the packets to be received at 50 ms intervals, reducing the variation in inter-packet delay. In a more concrete example, for four packets being delivered to the application, delays of 48 ms, 50 ms, 52 ms, and 50 ms may be preferred over delays of 50 ms, 20 ms, 70 ms, and 30 ms. In some examples, the scheduler may schedule other traffic first to ensure delivery of the packets to the user at the desired latency. In addition or alternatively, the scheduler may change a Quality of Service (QoS) class identifier (QCI) of the packets to a lower value (e.g. higher priority) to cause rapid transmission once the packet is released to the scheduler for scheduling of the transmission.

In addition or alternatively, in some examples, an application on the user equipment may buffer the packets when received and release the buffered packets for use at a consistent timing. The buffering application may be the mobile client application or another application. In such an example and using the same scenario as in the previous paragraph, the buffer and release operation may provide consistent 50 ms inter-packet delays (e.g. from the perspective of the consuming application) as long as the average inter-packet delay over the network remains at or below 50 ms. The UE-based functionality may be supplemental to the consistent delivery of packets by the base station. For example, while the base station may provide more consistent delivery than a best effort scheduling algorithm, the buffering release operation may supplement to provide additional consistency. Returning to the example of the four packets being delivered at delays of 48 ms, 50 ms, 52 ms, and 50 ms, the buffering application may smooth the inter-packet delays further to a consistent 50 ms. Alternatively, UE-based functionality may be utilized with a best effort scheduling algorithm to smooth the inter-packet delay. Returning to the example of the four packets being delivered at delays of 50 ms, 20 ms, 70 ms, and 30 ms, the buffer and release operation may provide consistent 50 ms inter-packet delays as long as the average inter-packet delay over the network remains at or below 50 ms. The first packet may be delivered at 50 ms. The second packet is received earlier than desired and delayed by 30 ms before delivery. This provides a 30 ms buffer time, 20 ms of which is used by the slow delivery of the third packet at 70 ms, leaving a 10 ms buffer time. The fourth packet again provides additional buffer time due to its arrival 20 ms earlier than desired. This may continue providing consistent 50 ms latency from the perspective of the consuming application as long as the average inter-packet delay over the network remains at or below 50 ms (e.g. the buffer time does not become negative).

Various examples of the present disclosure are described below in reference to the figures.

Figure 1:
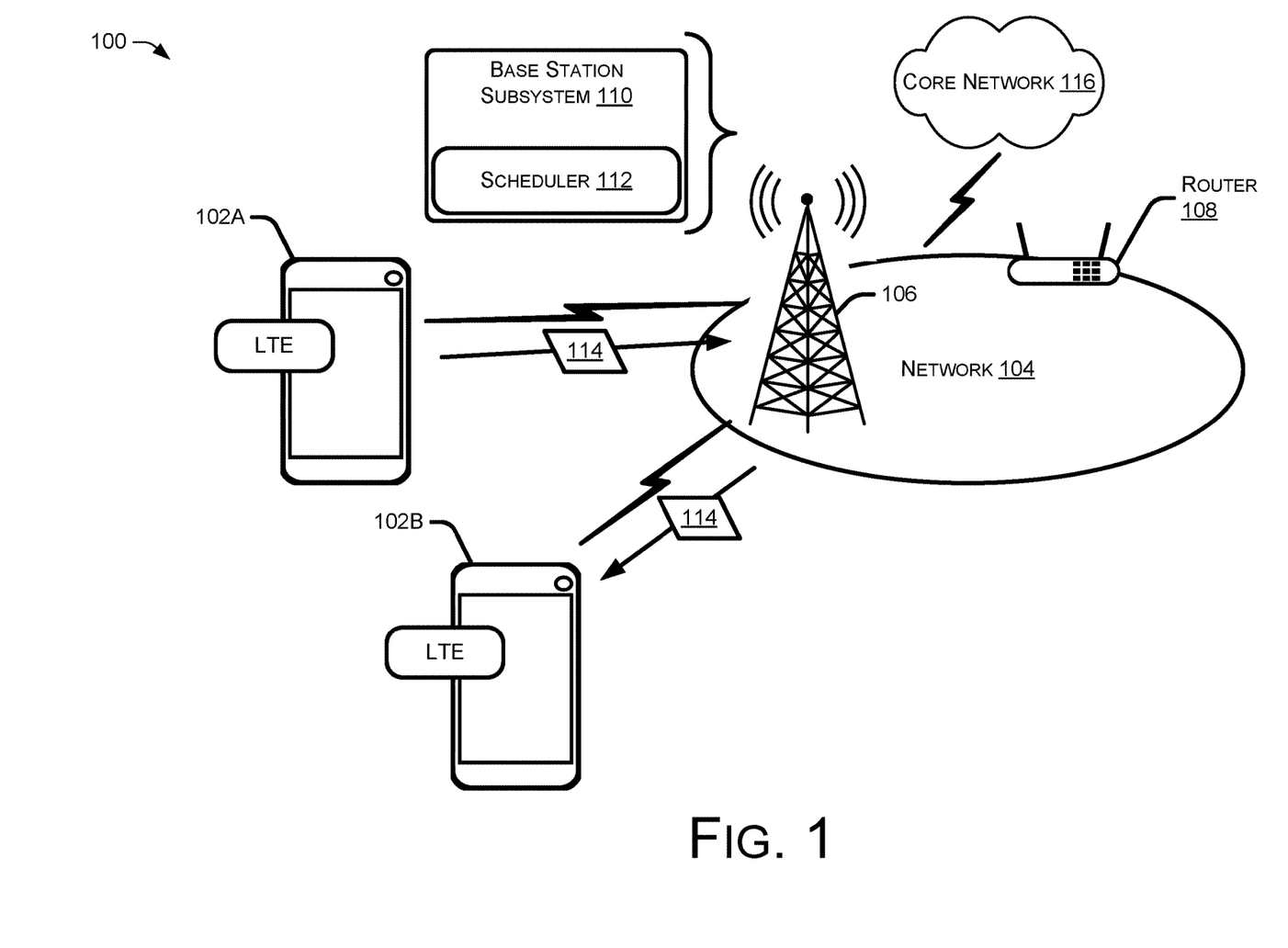
FIG. 1 illustrates an example telecommunication system, which may be configured to prioritize and ensure consistent latency for user data

FIG. 1 illustrates an example telecommunication system 100, which may be configured to prioritize and ensure consistent latency for user data.

In FIG. 1, one or more devices can be communicatively coupled to one or more networks 104. Device 102A and device 102B are two non-limiting examples of devices that can be communicatively coupled to the one or more networks 104. While two devices are shown, any number of devices can be communicatively coupled to the one or more networks 104. Each of the devices (e.g., device 102A, device 102B, etc.) can be configured with technology to enable the devices to communicate via a spectrum, such as LTE. Additional details associated with the one or more devices are described below with reference to FIG. 4.

In some examples, device 102A and/or device 102B can connect to the one or more networks 104 via base station 106, respectively. Base stations (e.g., base station 106) can enable access to the one or more networks 104, which can be used for the transmission of voice, data, etc. between the one or more devices (e.g., device 102A, device 102B, etc.) via the one or more networks 104. The one or more networks 104 can include a cellular network, the Internet, and/or one or more other networks (e.g., a Wi-Fi network, another access network, etc.).

In at least one example, a network of the one or more networks 104 may be configured to send and receive data communication via a spectrum, such as LTE. Router 108 is a non-limiting example of other wireless equipment that can share the spectrum with the equipment associated with the telecommunications service providers. Additional and/or alternative wireless equipment can be communicatively coupled to the one or more networks 104. Each piece of equipment (e.g., base station 106, router 108, etc.) can correspond to a node of a network of the one or more network(s) 104.

Each base station (e.g., base station 106) can be associated with a base station subsystem 110, which can be responsible for handling traffic and signaling between devices via the one or more networks 104. In at least one example, the base station subsystem 110 can include a scheduler 112 for generating a schedule to facilitate the transmission of data between devices (e.g., device 102A, device 102B, etc.) that are capable of communicating via the network 104. As described herein, a schedule can be specific to a particular base station and a particular time interval. That is, a schedule can be effective for a particular time interval and then a new schedule can be determined for a subsequent time interval. Additional details associated with the base station subsystem 110 and the scheduler 112 are described below with reference to FIG. 2. The base station subsystem 110 can leverage the schedule to facilitate data exchange between two or more devices communicatively coupled to the one or more networks 104. That is, the base station subsystem 110 can determine when a device (e.g., device 102A) can send data 114 uplink, that is, from the device (e.g., device 102A) to the base station 106 associated with the base station subsystem 110 and when a base station 106 can send data 114 downlink, that is, from the base station 106 to the device (e.g., device 102B) or another base station for transmission to another device (e.g., device 102B).

In at least one example, the base station(s) (e.g., base station 106) can be communicatively coupled to a core network 116. The core network 116 can be a central part of a telecommunications network that provides telecommunications services to end users associated with the one or more devices (e.g., device 102A, device 102B, etc.). In some examples, core network 116 can route data between base stations (e.g., base station 106). For instance, in at least one example, the core network 116 can be responsible for routing voice communication to other networks, as well as routing data communication to external packet switched networks, such as the Internet. In at least one example, the scheduler 112 can be associated with the core network 116 instead of, or in addition to, the base station subsystem 110.

In some examples, the base station 106, and more particularly the scheduler 112 of the base station subsystem 110, may be configured to provide consistent latency in delivery of content to the devices 102A and 102B. For example, the base station 106 may receive a consistent latency request from a device 102A requesting packets (e.g. packets associated with a particular application) be delivered at a desired latency or within a desired latency range. In some examples, the scheduler 112 may process various information related to the current conditions affecting communications with the requesting device 102A to make scheduling decisions that may cause packets to be received by the device 102A at the desired latency or within the desired latency range.

Some examples may perform a statistical regression analysis to determine the relationships between observed parameters like the Quality of Service Class Index (QCI), Physical Resource Block (PRB), inter-site distance, morphology of the network in the area of device 102A, and the cellular site latency. The results of the analysis may be used in implementing a scheduling algorithm. The analysis may be performed offline, before deploying a scheduler or may be performed online (e.g., in batches) or continuously. Further, the analysis may be performed on the UE, the base station 106, another network device or some combination thereof. Additional discussion of the analysis is provided with respect to FIG. 2.

Figure 2:
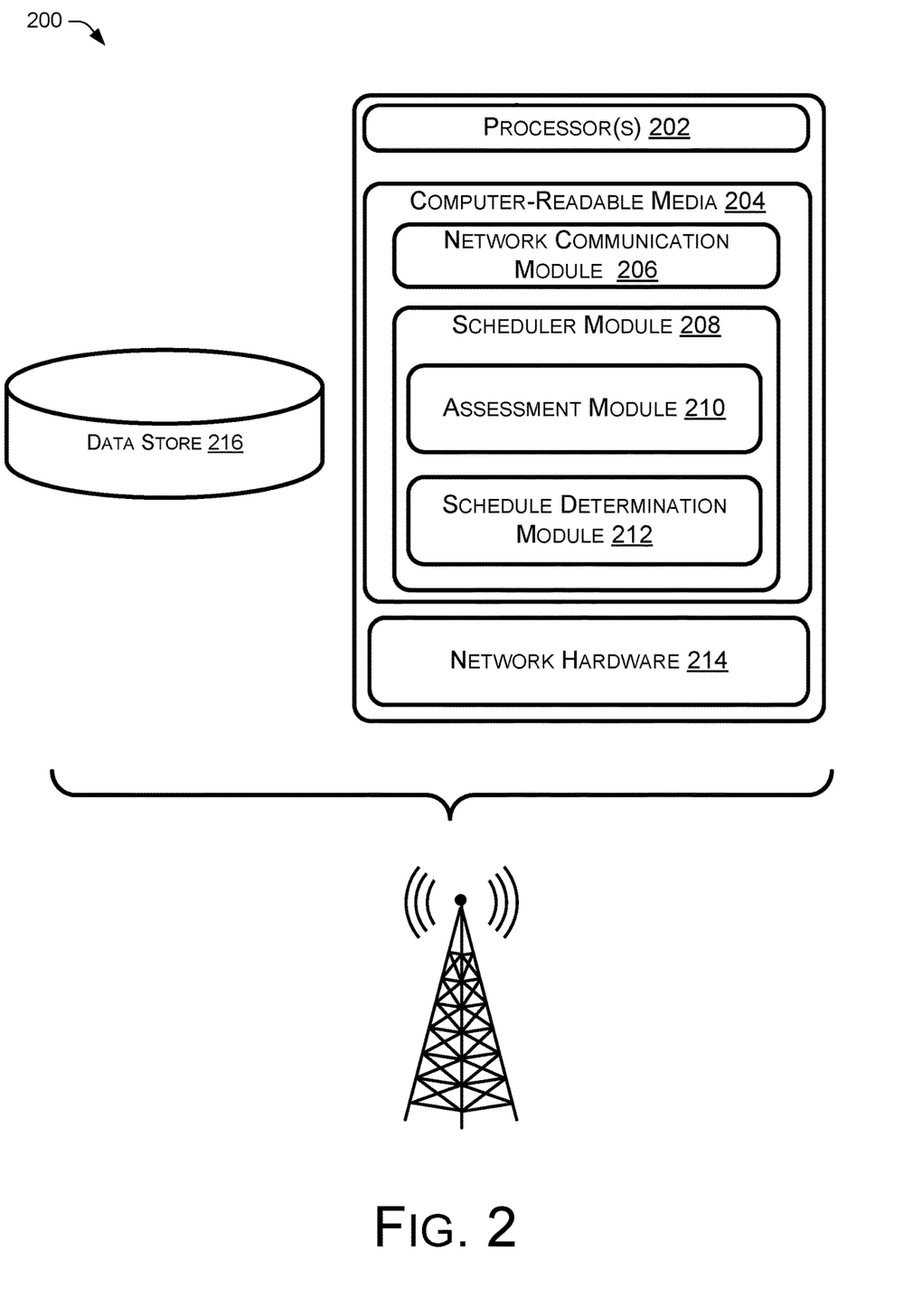
FIG. 2 illustrates an example base station subsystem configured to facilitate consistent latency for user data.

FIG. 2 illustrates an example base station subsystem 200 configured to facilitate consistent latency for user data. Base station subsystem 200 can correspond to the base station subsystem 110 described above with reference to FIG. 1. In an alternative example, one or more of the components and corresponding functionality described below can be associated with a core network (e.g., core network 116), as described above with reference to FIG. 1, in addition to, or instead of, the base station subsystem 110.

As illustrated in FIG. 2, the base station subsystem 200 can include processor(s) 202 and computer-readable media 204. Processor(s) 202 can represent, for example, a CPU-type processing unit, a GPU-type processing unit, a Field- Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 202 can execute one or more modules and/or processes to cause the servers 200 to perform a variety of functions, as set forth above and explained in further detail in the following disclosure. Additionally, each of the processor(s) 202 can possess its own local memory, which also can store program modules, program data, and/or one or more operating systems.

Depending on the exact configuration and type of the servers 200, the computer-readable media 204, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 204 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the presence server. Any such non-transitory computer-readable media can be part of the presence server.

In contrast, communication media includes computer readable instructions, data structures, program modules, or other data in a modulated data signal, such as a carrier wave, or other transmission mechanism. As defined herein, computer storage media does not include communication media.

The computer-readable media 204 can include one or more modules and data structures including, for example, a network communication module 206 and a scheduler module 208. The scheduler module 208 can correspond to the scheduler 112 described above with reference to FIG. 1. In at least one example, the scheduler module 208 can include an assessment module 210 and a schedule determination module 212. The one or more modules and data structures can be in the form of stand-alone applications, productivity applications, an operating system component, or any other application or software module having data items that facilitate interactions between the base station subsystem 200, devices (e.g., device 102A, device 102B, etc.), a core network (e.g., core network 116), and/or one or more networks (e.g., cellular network, Internet, and/or other network(s)), as described herein.

The network communication module 206 can facilitate sending and receiving communications (e.g., voice, data, etc.) between devices (e.g., device 102A, device 102B, etc.), a core network (e.g., core network 116), and/or other base stations (e.g., other base stations similar to 106) that are communicatively coupled to the one or more networks (e.g., cellular network, Internet, and/or other network(s)). In at least one example, a first device (e.g., device 102A) can request to send data to a second device (e.g., device 102B). The network communication module 206 can access a schedule, described above, to determine when the first device can send the data to the network communication module 206, via a corresponding base station (e.g., base station 106A). At a subsequent time, the network communication module 206 can access the schedule to determine when the network communication module 206 can send the data to the second device (e.g., device 102B), via a corresponding base station (e.g., base station 106 or other base stations).

The scheduler module 208 can assess network conditions and generate a schedule for exchanging data between two or more devices communicatively coupled to the one or more networks. The network communication module 206 can facilitate data exchange between two or more devices communicatively coupled to the one or more networks based on the schedule, as described above. That is, the network communication module 206 can leverage the schedule to determine when a device (e.g., device 102A) can send data uplink, that is, from the device (e.g., device 102A) to a base station (e.g., base station 106), which is associated with the base station subsystem 200, and when the base station (e.g., base station 106) can send data downlink, that is, from the base station to the device (e.g., device 102A) or another base station for transmission to another device (e.g., device 102B). For the purposes of the discussion herein, scheduler module 208 may operate according to a standard scheduling algorithm (e.g. such as a best effort scheduling algorithm without consistent latency functionality). The assessment module 210 and schedule determination module 212 may supplement this functionality to handle consistent latency requests. However, implementations are not so limited.

The assessment module 210 may be configured to assess the current conditions affecting communications with a device 102A associated with a consistent latency request. The assessment module 210 may assess the conditions at various intervals and without knowledge of upcoming data transmission events.

As discussed above, some examples may perform a statistical regression analysis to determine the relationships between observed parameters like the Quality of Service Class Index (QCI), Physical Resource Block (PRB), inter-site distance, morphology of the network in the area of device 102A, and the cellular site latency.

The QCI and PRB utilization may be factors in the latency that a user experiences. Data traffic on a lower QCI, e.g. QCI 2, may be received with in a lower latency than data traffic on a higher QCI, e.g. QCI 9. Similarly, a higher PRB utilization parameter may lead to a higher latency while a lower PRB utilization parameter may lead to lower latency.

The morphology of the network in a given area (e.g. in terms of connectivity and concentration such that suburban and urban areas may have different morphologies) may be a factor in the latency that a user experiences. Network morphology may be described by two separate elements: connectivity and concentration. Connectivity of a network may be defined as the relationship between the number of nodes and the number of connections between the nodes. In some examples, the higher the number of connections in relation to the number of nodes, the higher the connectivity. Concentration of a network may be defined as the number of connections between a certain node and the others. In some examples, the higher the number of connections from one node to all the others, the higher the concentration.

Site-to-site distances may also affect the latency that a user experiences. For example, lower site-to-site distances may result in reduced latency. Moreover, the radio condition of the user also may impact the latency such that a poorer radio condition may lead to higher latency.

In various examples, the assessment module 210 may process information of some of, all of, or similar to, the above types to produce an estimate of the current network conditions. The assessment module 210 may then determine packet transmission times for data packets associated with the consistent latency request for different parameters (e.g. QCI and PRB utilization parameters).

The results of the analysis may be used in implementing a scheduling algorithm. The analysis may be performed offline, before deploying a scheduler or may be performed online (e.g., in batches) or continuously. Further, the analysis may be performed on the UE, the base station 106, another network device or some combination thereof.

In some examples, the schedule determination module 212 may access data output from the assessment module 210 and may determine a schedule for actively managing data transmission such that consistent latency requests may be fulfilled. In an example, the schedule determination module 212 may determine a transmission time for transmitting a data packet or packet(s). The transmission time may correspond to a time in the future when the release of a data packet or packets to the scheduler 208 for transmission with a set of parameters (e.g. QCI and PRB utilization parameters) is estimated to cause receipt of the data packet(s) at a desired latency or latency range.

The schedule determination module 212 may be configured to receive the desired latency or latency range of a given application on the UE in a consistent latency request. The schedule determination module 212 may consider the desired latency or latency range in conjunction with all other information when making scheduling decisions. For example, the application on the UE may communicate a request for a consistent latency (e.g. 40 ms) or a latency range (e.g. 45-55 ms or 50 ms±5 ms) that the schedule determination module 212 of the scheduler module 208 may consider along with the other information previously listed.

While implementations herein are discussed as receiving the desired latency in a request, implementations are not so limited and, additionally or alternatively, predefined desired latencies for various application may be stored (e.g. in a database) on the base station subsystem 200 prior to the initiation of communication with the UE. The database information may identify the application, whether consistent latency is desired, and, if so, a desired latency. The schedule determination module 212 may, in response to initiation of communication with the UE associated with an application, lookup whether consistent latency is desired for the application and, if so, the desired latency.

In some examples, the schedule determination module 212 can determine transmission times to schedule for a packet or packets associated with a consistent latency request based on the desired latency or latency range, the current network condition from a most recent assessment and the estimated packet transmission times for data packets given different parameters (e.g. QCI and PRB utilization parameters) and network conditions.

It should be noted that implementations are not limited to any particular technique or process for the scheduler module 208 to schedule packets such that the packets arrive at a UE with a consistent desired latency and that the following are merely for ease of understanding.

In the case of congestion at a base station, some examples according to this disclosure may upgrade the user's QCI to ensure delivery with consistent latency. As discussed above, data packets with a low QCI may be transmitted sooner after release for scheduling in comparison to packets with higher QCI. As such, in some examples, the schedule determination module 212 may upgrade the QCI of data packets associated with the consistent latency request to a low QCI (e.g. QCI 1 or QCI 2) and release the data packets associated with the consistent latency request just in time. Specifically, the timing of the release for scheduling and transmission may be determined as the desired arrival time minus the sum of the estimated time from release to transmission of a packet at the upgraded QCI, the estimated time since the last packet associated with the request was received and the estimated time in flight of a packet (e.g. where both estimated times are based in given the current conditions). For example, given a scenario in which the desired consistent latency may be a 50 ms inter-packet delay, the current time since the last packet was received may be 15 ms, the time from releasing a packet for transmission to the actual transmission for a given upgraded QCI parameter may be 5 ms, and the time of flight after transmission may be 20 ms, the packet may be released in 10 ms (e.g. 50−(15+5+20)=10 ms) to cause the packet to be received 50 ms following the receipt of the prior packet (e.g. with a 50 ms inter-packet delay). In such examples, using upgraded QCI parameter values may reduce negative effects of latency variation in communication networks such as 4G LTE.

In some examples, the schedule determination module 212 may push packets using a control system (e.g. closed loop) to achieve the latency target or bound. A closed loop control system may be formed between the schedule determination module 212, an application operating on the UE 102, and the network communication module 206. For example, by using time stamp data of when packets were requested and received on the UE and sent by the base station, the closed loop control system evaluate a need for corrective action in conjunction with the UE application requirements (e.g. the latency target or bound). If latency performance is evaluated as outside the latency target or bound, then the QCI may be adjusted until latency performance meets the latency target or bound. Once the evaluated performance meets the latency target or bound, the closed loop control system may be configured to either maintain or downgrade the QCI as dynamic network conditions allow to maintain performance. Alternatively, in example embodiments in which all low latency traffic is placed in a single QCI (e.g. QCI 3), then a closed loop control system may function by dynamically adjusting the weighting of the QCIs to meet the desired variation in latency. To allow for such functionality, some embodiments may include an additional QCI parameter that may represent the weighting to be given to the QCIs. In operation, such closed loop control systems may allow the scheduler 208 to automatically regulate the latency of packets without human interaction.

Additional or alternative techniques may assist in providing consistent latency. Some examples may include an additional QCI parameter that may define a latency variation tolerance. For example, the additional QCI parameter may specify that an acceptable latency variation for QCI 1 is +/−1 ms, an acceptable latency variation for QCI 3 is +/−15 ms, an acceptable latency variation for QCI 9 is +/−50 ms and so on.

The scheduler 208 may determine priority or transmission orders among multiple streams of data packets related to multiple UEs or different applications on a particular UE while also considering any desired consistent latency involved. Because fulfilling consistent latency requests may involve delaying delivery of a packet (e.g. as opposed to delivering the packet using a best effort, early as possible, approach), data packets associated with a lower priority stream of data packets and an application that does not desire consistent latency may be released for scheduling and transmitted before data packets associated with a higher priority stream and an application that desires consistent latency. For example, the user device 102A may include a first application that desires consistent latency and has a higher relative priority when compared to a second application that does not request consistent latency that is operating on user device 102B. When scheduling a first data packet associated with the first application that the scheduler 208 or schedule determination module 212 determines would arrive before the desired inter-packet delay has elapsed if transmitted immediately, the first data packet may be delayed and, during the delay, a subsequently received data packet of the second application may be transmitted (e.g. transmitted before the first data packet, despite having lower priority and being received after the first data packet). Instead, the first data packet may be transmitted after the delay (e.g. at a timing estimated to cause the first data packet to arrive at or about the end of the desired inter-packet delay.

The base station subsystem 200 can further include network hardware 214. Network hardware 214 provides wired or wireless networking capabilities to the base station subsystem 200. The network hardware 214 may include or be incorporated into processors, application-specific integrated circuits (ASICs), programmable circuits such as field programmable gate arrays (FPGAs), or in other ways. The software modules stored on the computer-readable media 204 are configured to access hardware via interrupts, calling APIs, and the like. The software modules may also be configured to pass information to one another, such as through APIs, storing commands, parameters, etc. in a predetermined memory location, etc. Other examples are possible without departing from the scope of this disclosure.

In at least one example, the base station subsystem 200 can be associated with a data store 216. In some examples, the data store 216 is communicatively coupled to the base station subsystem 200. In other examples, the data store 216 is integral to the base station subsystem 200. The data store 216 can temporarily store data received from a first device (e.g., device 102A) prior to sending the data to a second device (e.g., device 102B). That is, the data store 216 can store data received from a first device (e.g., device 102A) until the network communication module 206 accesses the data to send the data to the second device (e.g., device 102B).

Figure 3:
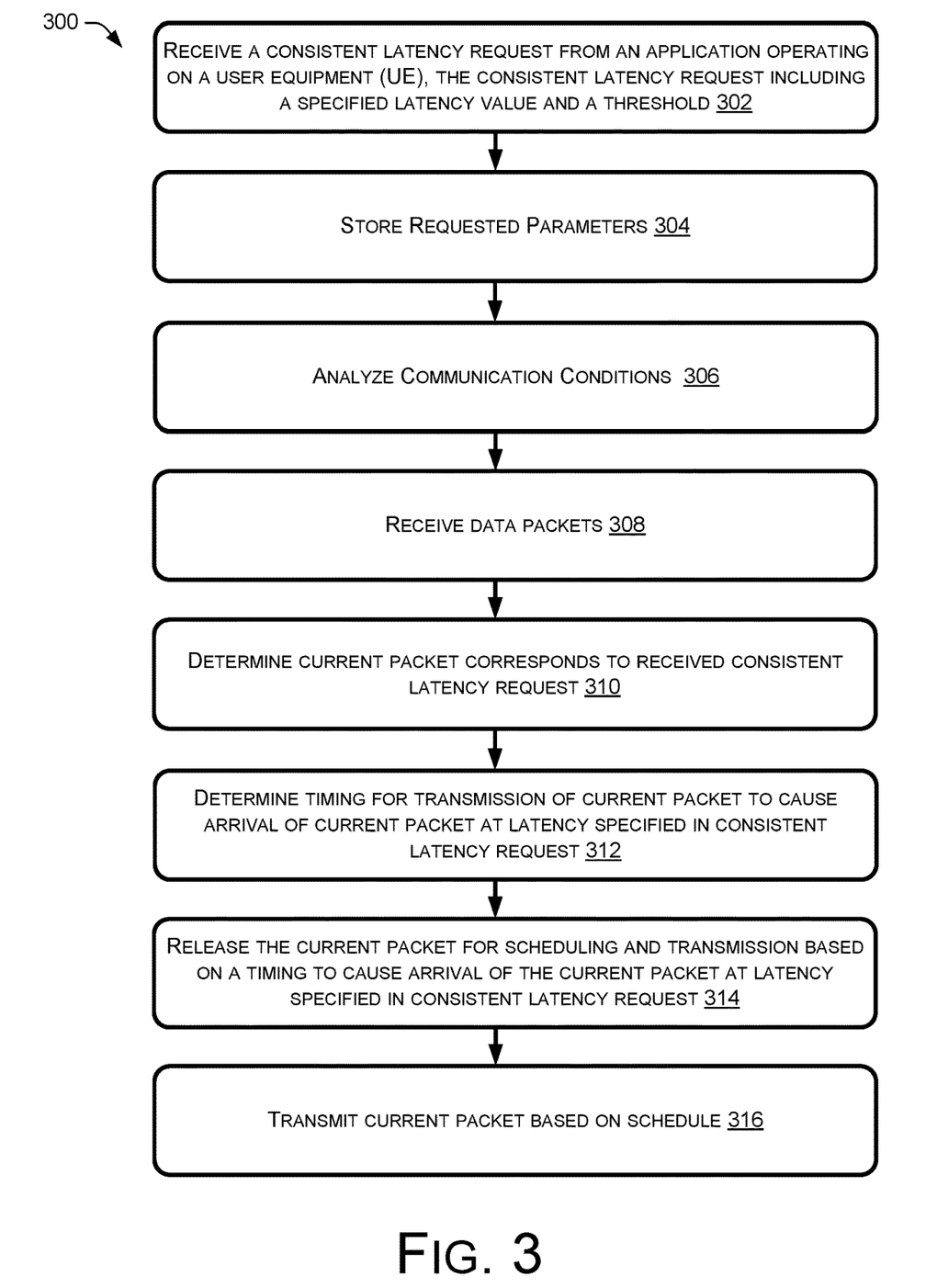
FIG. 3 illustrates an example process for providing consistent latency in content delivery.

FIG. 3 illustrates an example process 300 for providing consistent latency in content delivery according to some embodiments. More particularly, process 300 may relate to the processing at a base station such as an eNodeB of a LTE communication network. This process 300 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The process 300 can be performed by any component. For ease of discussion, the process 300 will be discussed in the context of FIG. 1 (and FIG. 2, in some cases). In examples, the process 300 is associated with the scheduling of packets for transmission to a UE by a scheduler of a base station.

In FIG. 3, at 302, the scheduler 112 may receive a consistent latency request from an application operating on a user equipment (UE). In some examples, the consistent latency request may include a specified latency value and a threshold. Together, the specified latency value and a threshold may represent a desired consistent latency and an acceptable tolerance threshold (e.g. an acceptable latency range).

At 304, the scheduler 112 may store the requested parameters. At 306, the scheduler 112 may analyze or assess the current network conditions.

At 308, the scheduler 112 may receive one or more data packets for transmission to UEs. At 310, the scheduler 112 may determine that one or more data packets corresponds to received consistent latency request(s). At 312, the scheduler 112 may determine a timing for transmission of a current packet to cause an arrival of the current packet at a destination UE at or about a desired latency specified in a corresponding consistent latency request. As discussed above, the scheduler 112 may upgrade the QCI or other parameters of the data packets to increase the accuracy of the estimated timing.

Then, at 314, the scheduler 112 may release the current packet for scheduling and transmission based on the determined timing to cause arrival of the current packet at the desired latency specified in the corresponding consistent latency request.

At 316, the current packet may be scheduled and transmitted to the destination UE. As discussed above, the timing of the release of the current packet for scheduling and transmission, along with any modified parameters, is estimated to cause the current packet to arrive at the destination UE at the desired latency specified in the corresponding consistent latency request.

Figure 4:
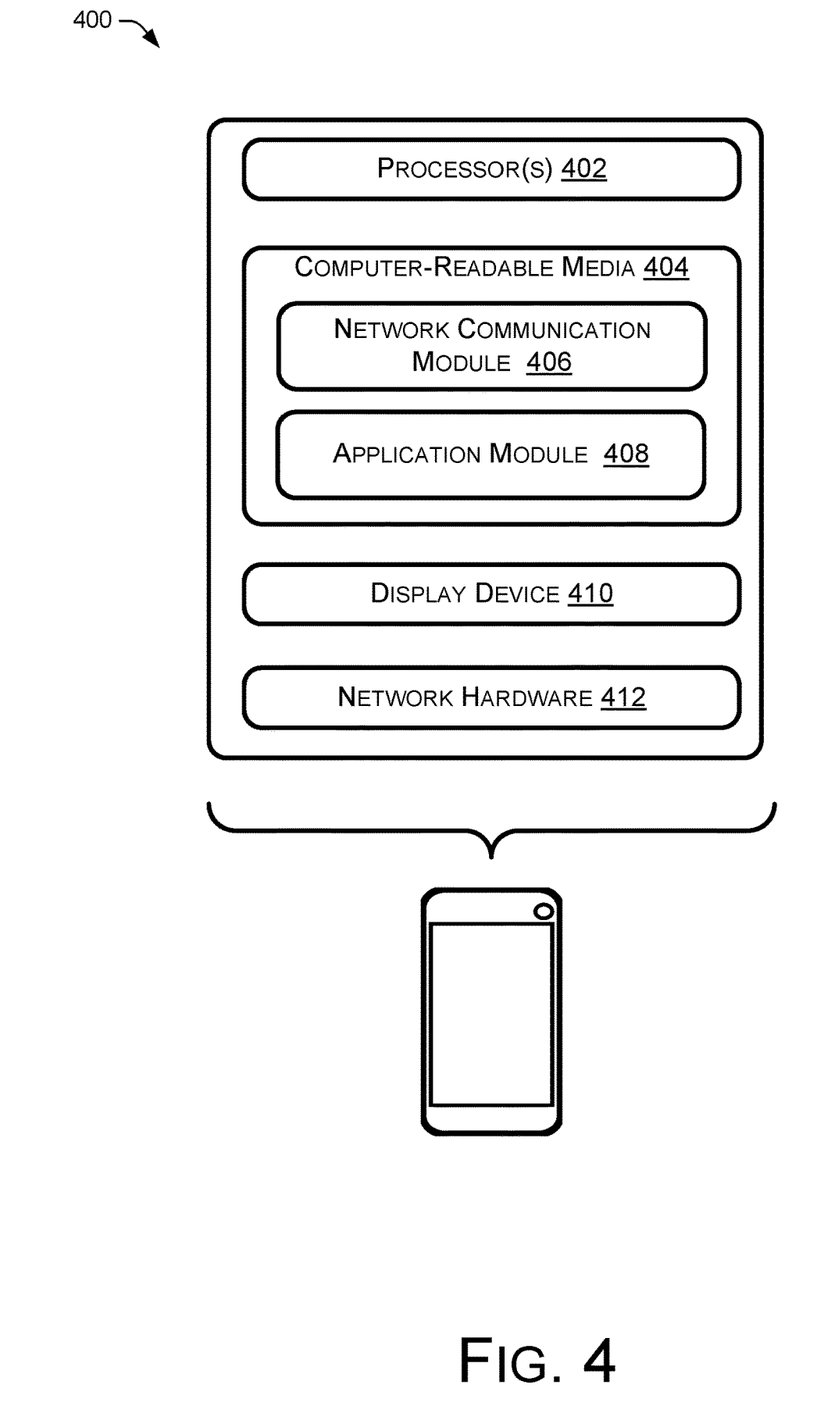
FIG. 4 illustrates an example mobile device configured to provide a consistent latency in content delivery.

FIG. 4 illustrates an example mobile device 400 configured to provide a consistent latency in content delivery according to some embodiments. In at least one example, mobile device 400 can correspond to user equipment (UE). The UE may include, but is not limited to, one or more of a smart phone, a personal digital assistant, a netbook, a laptop computer, a smart appliance, and/or another electronic device that is capable of sending or receiving voice, video, and/or data via the one or more networks (e.g., a cellular network, the Internet, and/or one or more other network(s)). Mobile device 400 can correspond to either device 102A or device 102B described above with reference to FIG. 1.

As illustrated in FIG. 4, the mobile device 400 can include processor(s) 402 and computer-readable media 404. Processor(s) 402 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 402 can execute one or more modules and/or processes to cause the mobile device 400 to perform a variety of functions, as set forth above and explained in further detail in the following disclosure. Additionally, each of the processor(s) 402 can possess its own local memory, which also can store program modules, program data, and/or one or more operating systems.

Depending on the exact configuration and type of the mobile device 400, the computer-readable media 404 can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 404 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the mobile device 400. Any such non-transitory computer-readable media can be part of the mobile device 400.

In contrast, communication media includes computer readable instructions, data structures, program modules, or other data in a modulated data signal, such as a carrier wave, or other transmission mechanism. As defined herein, computer storage media does not include communication media.

The computer-readable media 404 can include one or more modules and data structures including, for example, a communication module 406. The one or more modules and data structures can be in the form of stand-alone applications, productivity applications, an operating system component, or any other application or software module having data items that facilitate interactions between the devices (e.g., device 102A, device 102B, etc.), a core network (e.g., core network 116), and/or one or more networks (e.g., cellular network, Internet, other network(s), etc.), as described herein.

The communication module 406 can facilitate communications between the mobile device 400 and other devices via one or more networks (e.g., cellular network, Internet, other network(s), etc.), as described herein. For instance, the communication module 406 can facilitate sending calls, messages, etc. to other devices via one or more networks (e.g., cellular network, Internet, other network(s), etc.) and/or receiving calls, messages, etc. from other devices via one or more networks (e.g., cellular network, Internet, other network(s), etc.). In at least one example, the communication module 406 can send a request, via a corresponding base station (e.g., base station 106A) to the base station subsystem (e.g., base station subsystem 110), to send data to a second device (e.g., device 102B). The communication module 406 can receive instructions from a corresponding base station subsystem, described above with reference to FIG. 1, indicating when the communication module 406 can begin to send the data. In some examples, the instructions can indicate an amount of data that can be sent, how long the data can be sent, etc. The communication module 406 can send data to the base station subsystem for transmission to one or more other devices (e.g., device 102B). In some examples, the communication module 406 can packetize (e.g., partition) data into data packets and can send one or more data packets over the one or more networks. In other examples, the communication module 406 can send the data as a stream of data. The communication module 406 can also receive data sent by other devices (e.g., device 102B) over the one or more networks. In some examples, the communication module 406 can reassemble data packets received over the one or more networks to recreate the pre-packetized data.

The communication module 406 may request a consistent latency, for example, on behalf of an application operating on the mobile device 400. More particularly, the communication module 406 may be configured to transmit a consistent latency request to a scheduler of a carrier network (e.g. a scheduler of a base station currently serving mobile device 400). The consistent latency request may request the scheduler schedule transmission of one or more packets associated with the application operating on the mobile device 400 at a timing estimated to cause the one or more packets to arrive at the mobile device 400 meeting specified parameters.

In a first example, the specified parameters may be a consistent latency value or range as discussed above. In implementations according to the first example, the mobile device 400 may include the application module 408 to further smooth the latency of the received packets to further reduce latency variation. In some such implementations according to the first example, the initial packet or packet(s) of the communication may be sent without delay to establish a buffer window that may be able to prevent early variations from causing buffer depletion.

In a second example, the specified parameters may be a maximum latency value. As will be discussed in more detail below, in the second example, consistent latency may be provided by the application module 408, as long as the average latency over the course of the communication does not exceed the specified maximum latency.

The communication module 406 may receive data packets (e.g. via the network hardware) from the base station and may provide data packets associated with a consistent latency request to the application module 408.

The application module 408 may receive data packets associated with a consistent latency request from the communication module 406 and release the data packets to the associated application at the desired latency.

In some examples, the mobile device 400 may include a buffer and the application module 408 may buffer data packets associated with a consistent latency request. In some examples, each consistent latency request may be associated with an application operating on the mobile device and a buffer may be included for each consistent latency request.

Based at least in part on the desired latency of the corresponding consistent latency request, the application module 408 may provide a buffered packet from each buffer to the associated with application operating on the mobile device at the corresponding desired latency.

Display device 410 is a non-limiting example of an output interface for communicating information to users. In at least one example, the display device 410 is configured to present graphical user interfaces for conveying information to end users.

Network hardware 412 provides wireless UE capabilities, such as connecting to a cellular network base station, a Wi-Fi network, or other wireless networks. The network hardware 412 may include or be incorporated into processors, application-specific integrated circuits (ASICs), programmable circuits such as field programmable gate arrays (FPGAs), or in other ways. The software modules stored on the computer-readable media 404 are configured to access hardware via interrupts, calling APIs, and the like. The software modules may also be configured to pass information to one another, such as through APIs, by storing commands, parameters, etc. in a predetermined memory location, etc. Other examples are possible without departing from the scope of this disclosure.

Figure 5:
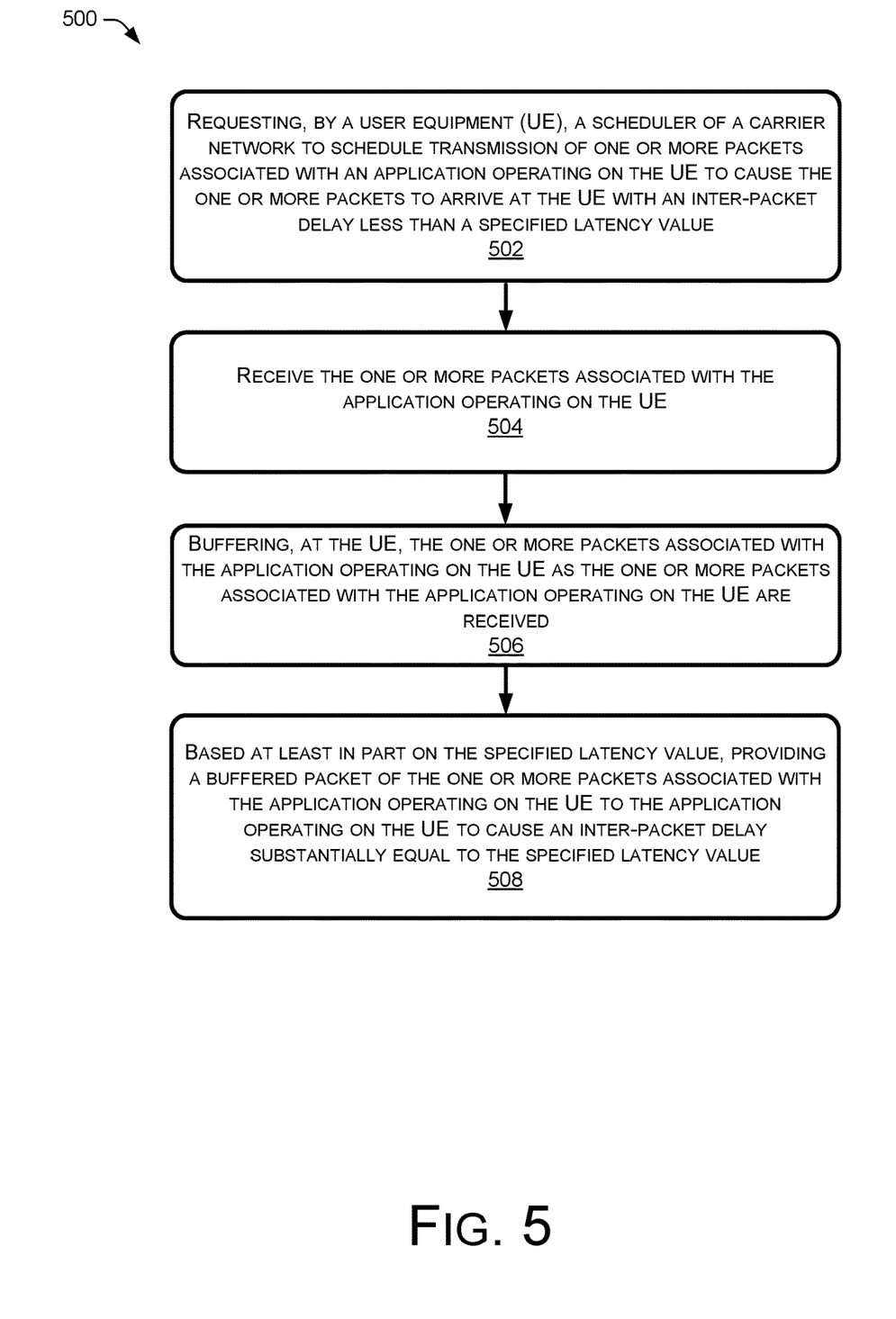
FIG. 5 illustrates an example process for providing consistent latency in content delivery.

FIG. 5 illustrates an example process 500 for providing consistent latency in content delivery according to some embodiments. More particularly, process 500 may relate to the processing at a mobile device such as a UE communicating with a LTE communication network. This process 500 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The process 500 can be performed by any component. For ease of discussion, the process 500 will be discussed in the context of FIG. 1 (and FIG. 4, in some cases). In examples, the process 500 is associated with requesting a consistent latency by a UE and the handling of packets associated with the consistent latency request at the UE upon receipt.

In FIG. 5, at 502, a user equipment (UE) may request a scheduler of a carrier network schedule transmission of one or more data packets associated with an application operating on the UE to cause the one or more data packets to arrive at the UE with an inter-packet delay less than a specified latency value. In a first example, the specified latency value may be a part of a consistent latency value or range such that the request may specify a desired consistent latency and an acceptable tolerance threshold (e.g. an acceptable latency range). In implementations according to the first example, the UE may include a module (e.g. application module 408) that further smooths the latency of the received packets to further reduce latency variation. In some such implementations according to the first example, the initial packet or packet(s) of the communication may be sent without delay to establish a buffer window that may be able to prevent early variations from causing buffer depletion. In a second example, the specified latency may not include a minimum latency value. In implementations according to the second example, the UE may include a module (e.g. application module 408) that may be configured to provide consistent latency, as long as the average latency over the course of communication does not exceed the specified maximum latency.

At 504, the UE may receive one or more packets associated with the application operating on the UE (e.g. associated with the consistent latency request). At 506, the UE may buffer the received packets associated with the consistent latency request as the packets are received.

At 508, the UE may, based on the specified latency value, provide a buffered packet to the associated application at timings determined to cause the inter-packet delay to be substantially equal to the specified desired latency.

Figure 6:
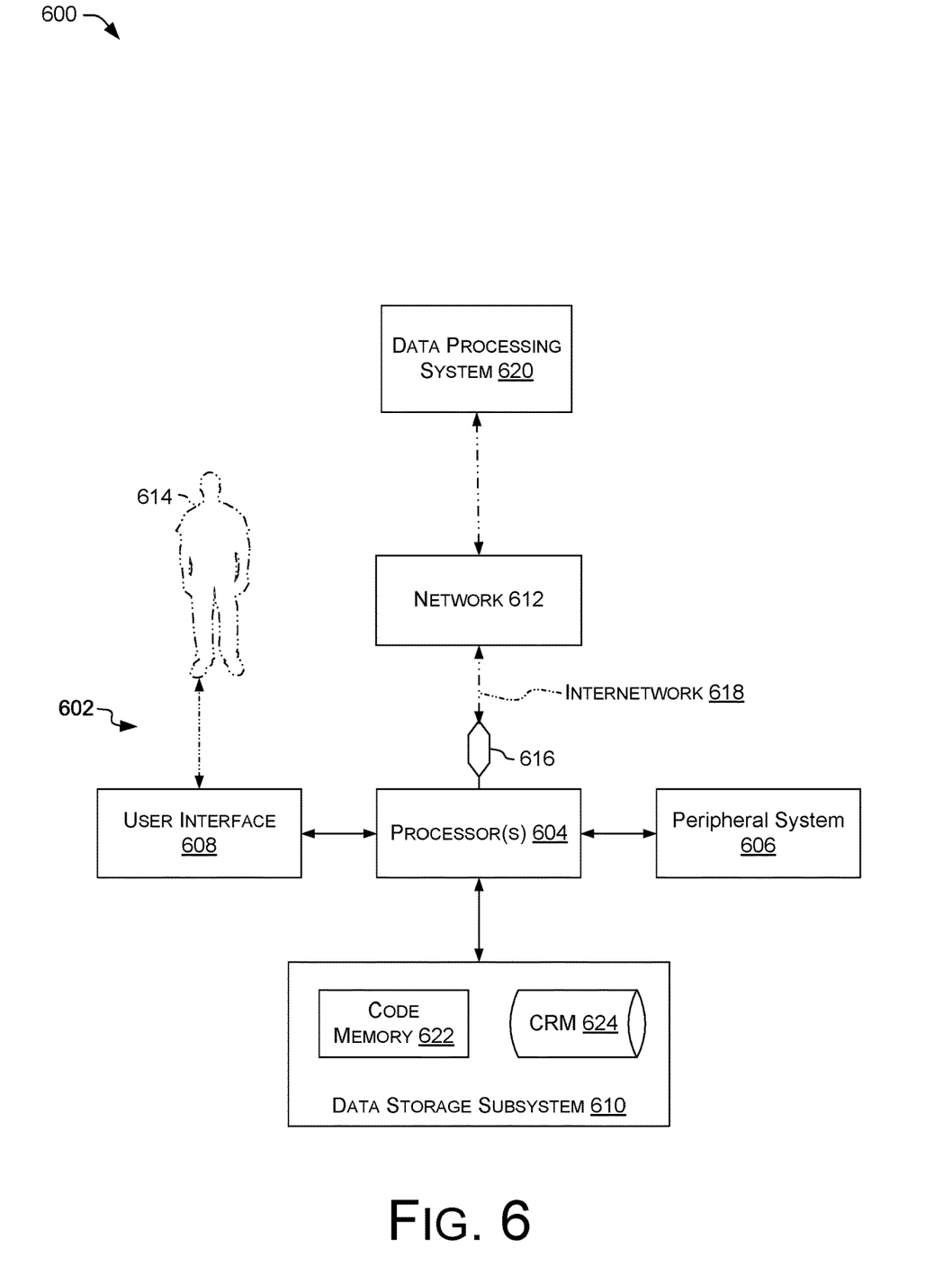
FIG. 6 is a high-level diagram showing the components of a data-processing system.

FIG. 6 is a high-level diagram 600 showing the components of an example data-processing system 602 for analyzing data and performing other analyses described herein, and related components. The system 602 includes a processor 604, a peripheral system 606, a user interface system 608, and a data storage system 610. The peripheral system 606, the user interface system 608, and the data storage system 610 are communicatively connected to the processor 604. Processor 604 can be communicatively connected to network 612 (shown in phantom), e.g., the Internet, a leased line, or a cellular network, as discussed below. Network 612 can be an example of internetwork 618. UEs or schedulers described herein, or other network nodes described herein, can each include one or more of systems 604, 606, 608, 610, and can each connect to one or more network(s) 612. Processor 604, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Some example systems and techniques described herein can permit computing devices to communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

Telecommunications networks, such as network 612 or a component thereof, may include a core network (e.g., an Internet Protocol, IP, Multimedia Subsystem, IMS, network) operated by one or more service providers ("carriers"), such as one or more cellular-telephony providers. The core network is connected via access networks, e.g., serving or home networks, to terminals (e.g., UEs). Terminals can be operated by users ("subscribers"), or can be autonomous. Example access networks carrying traffic of sessions can include second-generation (2G), third-generation (3G), or fourth-generation (4G) cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as Institute of Electrical and Electronics Engineers (IEEE) 802.11 (WIFI), 802.15.1 (BLUETOOTH), or 802.16 (WIMAX) networks carrying voice over Internet Protocol (VoIP) (e.g., VoWIFI) calls.

Some examples can include or be interoperable with Long Term Evolution (LTE) or 3GPP fifth-generation New Radio (5G NR) cellular networks, or any future IP-based cellular networks, carrying Voice over LTE (VoLTE) sessions using Session Initiation Protocol (SIP) signaling. In some examples, the network 612 can provide wide-area wireless coverage using a technology such as GSM or other 2G cellular technologies; the Universal Mobile Telecommunications System (UMTS) or other 3G cellular technologies; or LTE or other 4G cellular technologies. Example cellular-network technologies can include Code Division Multiple Access (CDMA), Time Division Multiple Access (TDMA), Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE RAN (GERAN), Universal Terrestrial RAN (UTRAN), or evolved UMTS Terrestrial RAN (E UTRAN).

Processor 604 can implement processes of various aspects described herein. Processor 604 and related components can, e.g., carry out processes for scheduling uplink or downlink packets to reduce latency variation, as described herein.

Processor 604 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 606, user interface system 608, and data storage system 610 are shown separately from the processor 604 but can be stored completely or partially within the processor 604.

The peripheral system 606 can include or be communicatively connected with one or more devices configured or otherwise adapted to provide digital content records to the processor 604 or to take action in response to processor 604. For example, the peripheral system 606 can include digital still cameras, digital video cameras, cellular phones, or other data processors. The processor 604, upon receipt of digital content records from a device in the peripheral system 606, can store such digital content records in the data storage system 610.

The user interface system 608 can convey information in either direction, or in both directions, between a user 614 and the processor 604 or other components of system 602. The user interface system 608 can include a mouse, a keyboard, another computer (connected, e.g., via a network or a null-modem cable), or any device or combination of devices from which data is input to the processor 604. The user interface system 608 also can include a display device, a processor-accessible memory, or any device or combination of devices to which data is output by the processor 604. The user interface system 608 and the data storage system 610 can share a processor-accessible memory.

In various aspects, processor 604 includes or is connected to communications interface 616 that is coupled via network link 618 (shown in phantom) to network 612. Network link 618 can include a wired or wireless communication connection. For example, communications interface 616 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communications interface 616 sends and receives electrical, electromagnetic, or optical signals that carry digital or analog data streams representing various types of information across network link 618 to network 612. Network link 618 can be connected to network 612 via a switch, gateway, hub, router, or other networking device.

In various aspects, system 602 can communicate, e.g., via network 612, with a data processing system 620, which can include the same types of components as system 602 but is not required to be identical thereto. Systems 602, 620 can be communicatively connected via the network 612. Each system 602, 620 can execute computer program instructions to conduct at least a portion of an exchange described herein. For example, system 602 can be a UE and system 620 can be a scheduler of a serving network, or vice versa.

Processor 604 can send messages and receive data, including program code, through network 612, network link 618, and communications interface 616. For example, a server can store requested code for an application program (e.g., a JAVA applet) on a tangible non-volatile computer-readable storage medium to which it is connected. The server can retrieve the code from the medium and transmit it through network 612 to communications interface 616. The received code can be executed by processor 604 as it is received, or stored in data storage system 610 for later execution.

Data storage system 610 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 604 can transfer data (using appropriate components of peripheral system 606), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 610 can be a tangible non-transitory computer-readable storage medium, i.e., a non-transitory device or article of manufacture that participates in storing instructions that can be provided to processor 604 for execution. In some examples, one of the processor-accessible memories in the data storage system 610 can be a non-volatile memory in a Subscriber Identity Module (SIM) card.

In an example, data storage system 610 includes code memory 622, e.g., a RAM, and computer-readable medium (CRM) 624, e.g., a tangible computer-readable medium (e.g., a hard drive or other rotational storage device, or a Flash drive or other nonvolatile storage device). Computer program instructions are read into code memory 622 from CRM 624. Processor 604 then executes one or more sequences of the computer program instructions loaded into code memory 622, as a result performing process steps described herein. In this way, processor 604 carries out a computer implemented process. For example, steps of methods described herein, blocks of the flowchart illustrations or block diagrams herein, and combinations of those, can be implemented by computer program instructions. Code memory 622 can also store data, or can store only code. In some examples, e.g., using high-speed nonvolatile memory, CRM 624 also functions as code memory 622, and a separate code memory 622 is not used.

In the illustrated example, systems 602 or 620 can be computing nodes in a cluster computing system, e.g., a cloud service or other cluster system ("computing cluster" or "cluster") having several discrete computing nodes (systems 602, 620) that work together to accomplish a computing task assigned to the cluster as a whole. In some examples, at least one of systems 602, 620 can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least one of systems 602, 620 can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than as a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 604 (and possibly also other processors), and that, when loaded into processor 604, cause functions, acts, or operational steps of various aspects herein to be performed by processor 604 (or other processor). Computer program code for carrying out operations for various aspects described herein may be written in any combination of one or more programming language(s), and can be loaded from CRM 624 into code memory 622 for execution. The program code may execute, e.g., entirely on processor 604, partly on processor 604 and partly on a remote computer connected to network 612, or entirely on the remote computer.

In some examples, a "control unit" as described herein includes processor 604. A control unit can also include, if required, data storage system 610 or portions thereof. For example, a control unit can include a CPU or DSP (processor 604), and can include a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically or via blown fuses or logic-cell configuration data) to perform functions described herein. In some example of control units including ASICs or other devices physically configured to perform operations described herein, a control unit does not include computer-readable media (e.g., CRM 624) storing processor-executable instructions.

Many variations on the examples discussed above are within the scope of this disclosure. For example, in some examples, the application level consistent latency functionality may be extended to include further granularity such as consistent latency requests and corresponding desired latencies for a plurality of applications on a particular UE or to more than one consistent latency request and corresponding desired latencies for a plurality of types of data packets for a particular application on the same UE. For example, a first consistent latency request may be set forth for a first type of data and a second consistent latency request may be set forth for a second type of data where the first and second types of data relate to communications of a single application operating on the UE.

Further, implementations are not limited to 4G or LTE. For example, the disclosed techniques and systems may be extended to 5G. For example, the functions of the eNodeB discussed above may be provided by the gNodeB of the 5G architecture and similar functionality to that provided by the usage of the QCI parameter above may be achieved through the 5QI parameter of 5G. Implementations of the disclosed techniques and systems in these and other variations and other communications technologies are within the scope of this disclosure.

Steps of various methods described herein can be performed in any order except when otherwise specified, or when data from an earlier step is used in a later step. Example method(s) described herein are not limited to being carried out by components particularly identified in discussions of those methods.

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing systems 602, 620 or processors 604, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method comprising:
receiving, by a base station of a carrier network, a consistent latency request associated with an application operating on a user equipment (UE), the consistent latency request including a specified latency value;
assessing, by the base station, current conditions affecting communications between the base station and the UE; and
based at least in part on the specified latency value and the current conditions, scheduling, by a scheduler of the base station, transmission of packets associated with the application to cause the packets to arrive at the UE with an inter-packet delay substantially equal to the specified latency value,
wherein the current conditions indicate a best available latency that is lower than the specified latency value and the inter-packet delay.

2. The method of claim 1, wherein the consistent latency request includes a specified threshold time period and the inter-packet delay substantially equal to the specified latency value is within the specified threshold time period of the specified latency value.

3. The method of claim 1, wherein the scheduling includes delaying the scheduling of a particular packet of the packets when immediate scheduling of the particular packet would cause the particular packet to arrive with an inter-packet delay less than substantially equal to the specified latency value.

4. The method of claim 3, further comprising:
when the immediate scheduling of the particular packet would cause the particular packet to arrive with the inter-packet delay less than substantially equal to the specified latency value, scheduling, by the scheduler, an additional transmission, to the UE, of an additional packet that is unrelated to the application operating on the UE before the particular packet when the additional packet has a lower priority than the packets.

5. The method of claim 1, wherein the scheduling further includes modifying a Quality of Service Class Identifier (QCI) of a particular packet of the packets to cause the particular packet to arrive at the UE with the inter-packet delay substantially equal to the specified latency value.

6. The method of claim 1, further comprising:
determining radio network conditions for communications between the carrier network and the UE, wherein the scheduling is further based at least in part on the radio network conditions.

7. The method of claim 1, further comprising:
determining radio network conditions for communications between the carrier network and the UE; and upgrading a Quality of Service Class Identifier (QCI) of the packets; and
wherein the scheduling, by the scheduler, of the transmission of the packets associated with the application operating on the UE includes delaying a release for scheduling of the particular packet until a release time, the release time being determined based on a specified arrival time for the particular packet at the UE, an estimated time from the release for scheduling of the particular packet to the transmission of the particular packet at the upgraded QCI, and an estimated time in flight of the particular packet.

8. A system comprising:
one or more processors; and
one or more non-transitory computer-readable media storing computer-executable instructions that, when executed by the one or more processors, cause the one or more processors to perform operations including:
receiving a consistent latency request associated with an application operating on a user equipment (UE), the consistent latency request identifying a specified latency value;
assessing current conditions affecting communications between the system and the UE; and
based at least in part on the specified latency value and the current conditions, scheduling transmission of packets associated with the application cause the packets to arrive at the UE with an inter-packet delay substantially equal to the latency value,
wherein the current conditions indicate a best available latency that is lower than the specified latency value and the inter-packet delay.

9. The system of claim 8, wherein the consistent latency request identifies a specified threshold time period and the inter-packet delay substantially equal to the specified latency value is within the specified threshold time period of the specified latency value.

10. The system of claim 8, wherein the scheduling includes delaying the scheduling of a particular packet of the packets when immediate scheduling of the particular packet would cause the particular packet to arrive with an inter-packet delay less than substantially equal to the specified latency value.

11. The system of claim 10, the operations further comprising:
when the immediate scheduling of the particular packet would cause the particular packet to arrive with the inter-packet delay less than substantially equal to the specified latency value, scheduling an additional transmission, to the UE, of an additional packet that is unrelated to the application operating on the UE before the particular packet when the additional packet has a lower priority than the packets.

12. The system of claim 8, wherein the scheduling further includes modifying a Quality of Service Class Identifier (QCI) of a particular packet of the packets to cause the particular packet to arrive at the UE with the inter-packet delay substantially equal to the specified latency value.

13. The system of claim 8, the operations further comprising:
determining radio network conditions for communications between the carrier network and the UE, wherein the scheduling further based at least in part on the radio network conditions.

14. The system of claim 8, the operations further comprising retrieving the specified latency value from a database, the specified latency value being previously stored therein and identified and retrieved based on the identification of the application.

15. The system of claim 8, the operations further comprising:
   determining radio network conditions for communications between the carrier network and the UE; and
   upgrading a Quality of Service Class Identifier (QCI) of the packets; and
   wherein the scheduling of the transmission of the packets associated with the application includes delaying a release for scheduling of the particular packet until a release time, the release time being determined based on a specified arrival time for the particular packet at the UE, an estimated time from the release for scheduling of the particular packet to the transmission of the particular packet at the upgraded QCI, and an estimated time in flight of the particular packet.

16. The system of claim 8, wherein a Quality of Service Class Identifier (QCI) associated with the packets includes a parameter specifying a latency variation tolerance threshold and wherein the inter-packet delay substantially equal to the specified latency value is within the latency variation tolerance threshold of the specified latency value.

17. One or more non-transitory computer-readable media storing instructions that, when executed, cause one or more processors to perform acts comprising:
   requesting, by a user equipment (UE) in a consistent latency request, a scheduler of a carrier network to schedule transmission of packets associated with an application operating on the UE, the consistent latency request including a specified latency value;
   receiving, at the UE, the packets associated with the application, wherein the packets are received at a first inter-packet delay within a threshold range of the specified latency value;
   buffering, at the UE, the packets associated with the application as the packets are received; and
   providing a buffered packet of the packets to the application to cause a second inter-packet delay substantially equal to the specified latency value.

18. The one or more non-transitory computer-readable media of claim 17, wherein the requesting includes requesting the scheduler of the carrier network to schedule transmission of the packets to cause the packets to arrive at the UE with the first inter-packet delay greater than a minimum latency value.

19. The one or more non-transitory computer-readable media of claim 17, the acts further comprising requesting, by the user equipment (UE), the scheduler of the carrier network to schedule transmission of one or more additional packets associated with an additional application operating on the UE to cause the one or more additional packets to arrive at the UE with a different inter-packet delay substantially equal to a different specified latency value.

20. The one or more non-transitory computer-readable media of claim 17, the acts further comprising:
   determining radio network conditions for communications between the carrier network and the UE;
   providing the determined radio network conditions to a base station including the scheduler; and
   wherein the UE requests the base station schedule the transmission of the packets based at least in part on the determined radio network conditions.

* * * * *